(12) United States Patent
Fujitani

(10) Patent No.: US 11,977,000 B2
(45) Date of Patent: May 7, 2024

(54) DAMAGE ESTIMATION DEVICE AND DAMAGE ESTIMATION METHOD

(71) Applicant: TOYOTA JIDOSHA KABUSHIKI KAISHA, Toyota (JP)

(72) Inventor: Hiroshi Fujitani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 394 days.

(21) Appl. No.: 17/467,876

(22) Filed: Sep. 7, 2021

(65) Prior Publication Data

US 2022/0146374 A1   May 12, 2022

(30) Foreign Application Priority Data

Nov. 11, 2020   (JP) .................................. 2020-188005

(51) Int. Cl.
*G01M 15/04*   (2006.01)
(52) U.S. Cl.
CPC ................................ *G01M 15/048* (2013.01)
(58) Field of Classification Search
CPC ...... G01M 15/048; F02B 29/04; F02B 77/083
USPC ........................................................ 702/34
See application file for complete search history.

(56) References Cited

U.S. PATENT DOCUMENTS

| | | | | |
|---|---|---|---|---|
| 2014/0372009 A1* | 12/2014 | Song | ................... | F02D 41/1441 |
| | | | | 701/108 |
| 2015/0142338 A1* | 5/2015 | Nakano | ................. | F02D 41/222 |
| | | | | 702/35 |
| 2016/0138460 A1* | 5/2016 | Kim | ....................... | F02M 26/22 |
| | | | | 123/41.1 |
| 2016/0153367 A1* | 6/2016 | Yoon | ................... | F02B 29/0493 |
| | | | | 701/102 |
| 2016/0169100 A1* | 6/2016 | Hanawa | ............. | F02M 35/1038 |
| | | | | 73/114.68 |

FOREIGN PATENT DOCUMENTS

JP          2012-012996 A    1/2012

* cited by examiner

*Primary Examiner* — Ricky Go
(74) *Attorney, Agent, or Firm* — Finnegan, Henderson, Farabow, Garrett & Dunner, LLP.

(57) ABSTRACT

A damage estimation device includes an acquisition unit that acquires a temperature change amount in a period during which an inflow air temperature rises and a period length, a distortion amount derivation unit that derives a distortion amount of a cooling device in the above period, based on the temperature change amount, and a damage value derivation unit that derives an accumulated damage value by integrating a value depending on the distortion amount. When the period length is shorter than a period length determination value, the distortion amount derivation unit derives a larger value as the distortion amount than when the period length is equal to or longer than the period length determination value.

6 Claims, 6 Drawing Sheets

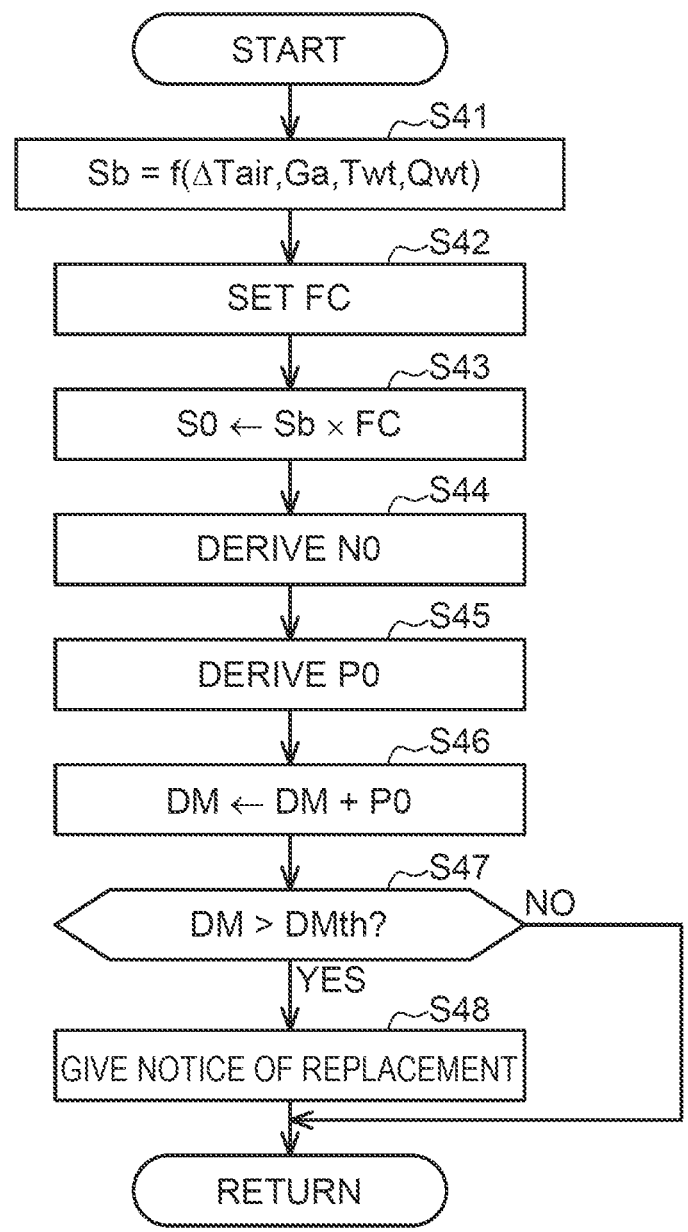

DAMAGE ESTIMATION DEVICE AND DAMAGE ESTIMATION METHOD

CROSS-REFERENCE TO RELATED APPLICATION

This application claims priority to Japanese Patent Application No. 2020-188005 filed on Nov. 11, 2020, incorporated herein by reference in its entirety.

BACKGROUND

1. Technical Field

The present disclosure relates to a damage estimation device and damage estimation method for estimating the degree of fatigue accumulated in a cooling device.

2. Description of Related Art

Japanese Unexamined Patent Application Publication No. 2012-12996 (JP 2012-12996 A) describes an exemplary diagnosis device that diagnoses deterioration states of a starter motor and a battery. The diagnosis device diagnoses the deterioration states of the starter motor and the battery, based on information relevant to a battery voltage at the start of an internal combustion engine by driving the starter motor, information relevant to an energization time of the starter motor, and information relevant to an engine rotation speed.

SUMMARY

When the accumulation amount of fatigue of a cooling device is large, the replacement or maintenance of the cooling device is necessary. As the cooling device, there is an intercooler that cools air that flows through an intake passage. For performing the replacement or maintenance of the cooling device at an appropriate moment, it is necessary to estimate the degree of the fatigue accumulated in the cooling device. However, JP 2012-12996 A does not mention the estimation of the degree of the fatigue accumulated in the cooling device at all.

A damage estimation device for solving the above problem is a device that estimates degree of fatigue accumulated in a cooling device, the cooling device cooling air that flows through an intake passage. The damage estimation device includes: an acquisition unit configured to acquire a temperature change amount and a period length, the temperature change amount being the change amount of an inflow air temperature in a period during which the inflow air temperature rises, the inflow air temperature being the temperature of air that flows in the cooling device, the period length being the temporal length of the period; a distortion amount derivation unit configured to derive a distortion amount such that the value of the distortion amount is larger as the temperature change amount is larger, the distortion amount being degree of distortion of the cooling device in the period; and a damage value derivation unit configured to derive an accumulated damage value by integrating a value depending on the distortion amount, the accumulated damage value being the degree of the fatigue accumulated in the cooling device. Further, when the period length is shorter than a period length determination value, the distortion amount derivation unit derives a larger value as the distortion amount than when the period length is equal to or longer than the period length determination value.

In the period during which the inflow air temperature rises, temperature distribution is generated in the cooling device, and therefore, distortion is generated in the cooling device. By repeat of the distortion, the fatigue of the cooling device is accumulated. Further, the degree of the distortion of the cooling device is larger as the temperature change amount in the above period is larger. Furthermore, even when the temperature change amount in the above period is the same, the degree of the distortion is larger as the change speed of the intake air temperature is higher.

With the above configuration, in the period during which the intake air temperature rises, the rise amount of the intake air temperature in the period is derived as the temperature change amount. Further, the distortion amount is derived in consideration of not only the temperature change amount but also the period length. Thereby, it is possible to derive a larger value as the distortion amount, as the accumulation speed of the fatigue of the cooling device due to the generation of the distortion is higher. Further, the accumulated damage value is derived by integrating the value depending on the distortion amount. Thereby, it is possible to estimate the degree of the fatigue accumulated in the cooling device.

In an aspect of the above damage estimation device, the acquisition unit may acquire a temperature change amount and a period length, the temperature change amount being the change amount of the inflow air temperature in a period during which the inflow air temperature fails, the period length being the temporal length of the period, and the distortion amount derivation unit may derive the distortion amount of the cooling device in the period during which the inflow air temperature falls, such that the value of the distortion amount is larger as the temperature change amount in the period is larger.

Also in the period during which the inflow air temperature falls, the temperature distribution is generated in the cooling device, and therefore, the distortion is generated in the cooling device. Further, the degree of the distortion of the cooling device is larger as the temperature change amount in the period during which the inflow air temperature falls is larger. Furthermore, even when the temperature change amount in the period during which the inflow air temperature falls is the same, the degree of the distortion is larger as the change speed of the inflow air temperature is higher.

With the above configuration, in the period during which the inflow air temperature falls, the fall amount of the inflow air temperature in the period is derived as the temperature change amount. Further, the distortion amount of the cooling device in the period during which the inflow air temperature falls is derived in consideration of the temperature change amount in the period and the period length. As a result, it is possible to derive the accumulated damage value, using the distortion amount in the period during which the inflow air temperature falls, in addition to the distortion amount in the period during which the inflow air temperature rises. Accordingly, it is possible to increase the estimation accuracy of the degree of the fatigue accumulated in the cooling device.

In an aspect of the above damage estimation device, when the period length is shorter than the period length determination value, the distortion amount derivation unit may derive a larger value as the distortion amount, as the period length is shorter, and when the period length is equal to or longer than the period length determination value, the distortion amount derivation unit may derive a predetermined value as the distortion amount.

With the above configuration, when the period length is shorter than the period length determination value, the change speed of the inflow air amount in the above period is high, and therefore, the degree of the distortion of the cooling device is estimated to be large. Therefore, as the period is shorter, a larger value is derived as the distortion amount. On the other hand, when the period length is equal to or longer than the period length determination value, the change speed of the inflow air amount in the above period is not high, and therefore, there is little change in the degree of the distortion of the cooling device due to the difference in the change speed. Consequently, when the period length is equal to or longer than the period length determination value, a predetermined value is derived as the distortion amount. By deriving the accumulated damage value based on the distortion amount derived in this way, it is possible to increase the estimation accuracy of the degree of the fatigue accumulated in the cooling device.

In an aspect of the above damage estimation device, the damage value derivation unit may derive the accumulated damage value, by executing a conversion process of converting the distortion amount into a distortion damage value and integrating the distortion damage value, the distortion damage value being degree of fatigue of the cooling device due to generation of distortion. For example, in the conversion process, when the distortion amount is larger than a distortion amount determination value, the damage value derivation unit may derive a larger value as the distortion damage value, as the distortion amount is larger. In the conversion process, when the distortion amount is equal to or smaller than the distortion amount determination value, the damage value derivation unit may derive "0" as the distortion damage value.

When the distortion amount is small, the accumulation of the fatigue of the cooling device due to the generation of the distortion can be regarded as nearly "0". On the other hand, when the distortion amount is large, the accumulation of the fatigue of the cooling device due to the generation of the distortion can be estimated to be larger as the distortion amount is larger. In this regard, with the above configuration, at the time of converting the distortion amount into the distortion damage value by the conversion process, when the distortion amount is larger than the distortion amount determination value, it can be determined that the distortion amount is large. Therefore, as the distortion amount is larger, a larger value is derived as the distortion damage value. On the other hand, when the distortion amount is equal to or smaller than the distortion amount determination value, it can be determined that the distortion amount is small, and therefore, "0" is derived as the distortion damage value. Then, based on the distortion damage value, the accumulated damage value is derived. Thereby, it is possible to increase the estimation accuracy of the degree of the fatigue accumulated in the cooling device.

The cooling device included in an aspect of the above damage estimation device may be a water-cooled-type cooling device. In this case, the distortion amount derivation unit may derive the distortion amount based on an intake air amount, the temperature of coolant that is supplied to the cooling device, and the supply amount of the coolant to the cooling device, in addition to the temperature change amount. With this configuration, it is possible to increase the derivation accuracy of the distortion amount compared to the case where the distortion amount is derived in consideration of only the temperature change amount.

An aspect of the above damage estimation device may include a notification processing unit configured to give notice when the accumulated damage value is larger than a threshold value. With this configuration, when the accumulated damage value is larger than the threshold value, it can be determined that the fatigue of the cooling device has been accumulated to a level at which the replacement or maintenance of the cooling device is necessary, and therefore, it is possible to inform an owner or occupant of the vehicle that the replacement or maintenance of the cooling device is necessary.

A damage estimation method for solving the above problem is a method for estimating degree of fatigue accumulated in a cooling device, the cooling device cooling air that flows through an intake passage of a drive source. The damage estimation method includes: a period information acquisition process of acquiring a temperature change amount and a period length, the temperature change amount being the change amount of an inflow air temperature in a period during which the inflow air temperature rises, the inflow air temperature being the temperature of air that flows in the cooling device, the period length being the temporal length of the period; a distortion amount derivation process of deriving a distortion amount such that the value of the distortion amount is larger as the temperature change amount acquired in the period information acquisition process is larger, the distortion amount being degree of distortion of the cooling device in the period; and a damage value derivation process of deriving an accumulated damage value by integrating a value depending on the distortion amount derived in the distortion amount derivation process, the accumulated damage value being the degree of the fatigue accumulated in the cooling device. In the distortion amount derivation process, when the period length is shorter than a period length determination value, a larger value is derived as the distortion amount than when the period length is equal to or longer than the period length determination value.

With the above configuration, by executing each of the above processes, it is possible to obtain actions and effects equivalent to those in the above damage estimation device.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 8 is a flowchart for describing a processing routine that is executed by a server control device of the server in the second embodiment.

DETAILED DESCRIPTION OF EMBODIMENTS

First Embodiment

An embodiment of a damage estimation device and a damage estimation method will be described below with reference to FIG. 1 to FIG. 5.

Figure 1:
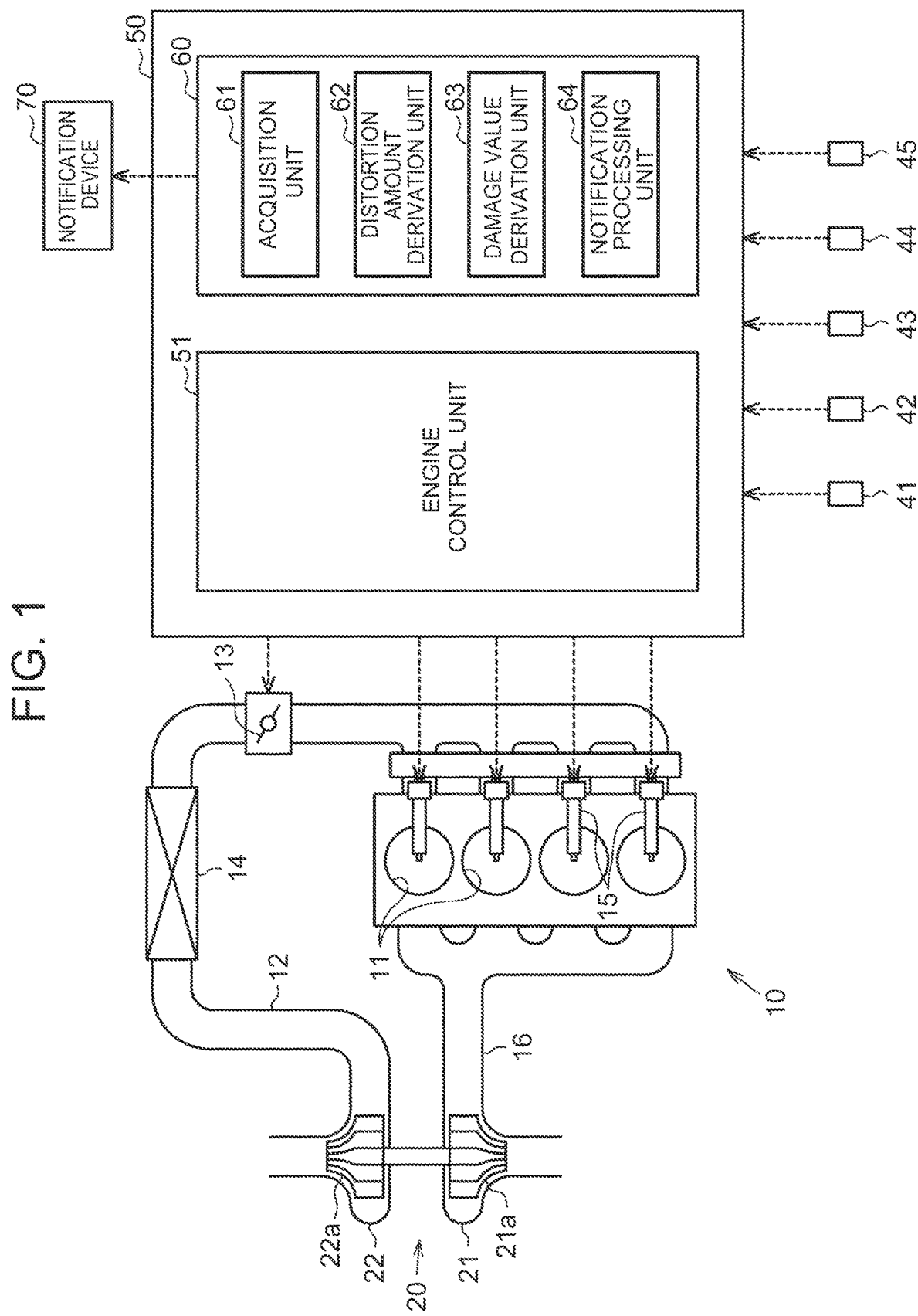
FIG. 1 is a diagram showing a schematic configuration of an internal combustion engine and a functional configuration of a control device that controls the internal combustion engine in a first embodiment.

FIG. 1 illustrates a control device 50 that includes a damage estimation device 60 and an internal combustion engine 10 that is controlled by the control device 50. In the embodiment, the internal combustion engine 10 corresponds to a "drive source".

Internal Combustion Engine 10

As shown in FIG. 1, the internal combustion engine 10 includes a plurality of cylinders 11 and an intake passage 12 through which air to be introduced to the cylinders 11 flows. The intake passage 12 is provided with a throttle valve 13 to adjust an intake air amount that is the introduction amount of the air to the cylinders 11. In the intake passage 12, a cooling device 14 to cool the air that flows through the intake passage 12 is disposed upstream of the throttle valve 13. Examples of the cooling device 14 include a water-cooled-type intercooler.

The internal combustion engine 10 includes a plurality of fuel injection valves 15 that correspond to the plurality of cylinders 11 respectively. Examples of the fuel injection valve 15 include an in-cylinder injection valve that directly injects fuel into the cylinder 11 and a port injection valve that injects fuel into the intake passage 12. In each cylinder 11, an air-fuel mixture containing air and fuel is combusted. A crankshaft of the internal combustion engine 10 is rotated by dynamic power obtained by the combustion of the air-fuel mixture. Exhaust air generated by the combustion of the air-fuel mixture in the cylinders 11 is discharged to an exhaust passage 16.

In the embodiment, the internal combustion engine 10 includes an exhaust-driven-type turbocharger 20. The turbocharger 20 includes a turbine housing 21 provided on the exhaust passage 16 and a compressor housing 22 disposed upstream of the cooling device 14 on the intake passage 12. A turbine wheel 21a is provided in the turbine housing 21. A compressor wheel 22a that rotates in synchronization with the turbine wheel 21a is provided in the compressor housing 22. When the turbocharger 20 is operating, air compressed by the compressor wheel 22a flows in the cooling device 14. Then, air cooled by the cooling device 14 passes through the throttle valve 13, and is introduced into the cylinders 11.

Control Device 50

The control device 50 receives detection signals from various sensors. Examples of the sensors include a crank angle sensor 41, an airflow meter 42, an intake temperature sensor 43, a coolant temperature sensor 44 and a flow rate sensor 45. The crank angle sensor 41 outputs a detection signal depending on an engine rotation speed Ne that is the rotation speed of the crankshaft. The airflow meter 42 detects an intake air amount Ga that is the flow rate of the air flowing through the intake passage 12, and outputs a detection signal depending on the detection result. The intake temperature sensor 43 detects an inflow air temperature Tair that is the temperature of the air flowing through the intake passage 12 and flowing in the cooling device 14, and outputs a detection signal depending on the detection result. The coolant temperature sensor 44 detects a coolant temperature Twt that is the temperature of coolant to be supplied to the cooling device 14, and outputs a detection signal depending on the detection result. The flow rate sensor 45 detects a coolant amount Qwt that is the amount of the coolant to be supplied to the cooling device 14, and outputs a detection signal depending on the detection result.

The control device 50 only needs to have any one configuration of (a) to (c) described below.

(a) The control device 50 includes one or more processors that execute various processes in accordance with computer programs. Each processor includes a CPU and a memory such as a RAM and a ROM. The memory contains program codes or commands configured such that the CPU executes the processes. The memory, that is, computer-readable media include all utilizable media that can be accessed by a general-purpose or dedicated computer.

(b) The control device 50 includes one or more dedicated hardware circuits that execute the various processes. Examples of the dedicated hardware circuits include an application specific integrated circuit, namely, an ASIC, and an FPGA. "ASIC" is an abbreviation of "Application Specific Integrated Circuit", and "FPGA" is an abbreviation of "Field Programmable Gate Array".

(c) The control device 50 includes a processor that executes some of the various processes in accordance with computer programs, and a dedicated hardware circuit that executes the other processes of the various processes.

The control device 50 includes an engine control unit 51 as a functional unit that controls the operation of the internal combustion engine 10. The engine control unit 51 controls the operation of the internal combustion engine 10, by controlling various actuators included in the internal combustion engine 10. Examples of the actuators include an actuator that operates the throttle valve 13, and the fuel injection valve 15.

The control device 50 includes a damage estimation device 60 as a functional unit that estimates the degree of fatigue accumulated in the cooling device 14. The damage estimation device 60 includes an acquisition unit 61, a distortion amount derivation unit 62 and a damage value derivation unit 63.

When the inflow air temperature Tair rises, the acquisition unit 61 acquires the rise amount of the inflow air temperature Tair in a period during which the inflow air temperature Tair rises, as a temperature change amount $\Delta$Tair, and acquires the temporal length of the period, as a period length $\Delta$TM. Further, when the inflow air temperature Tair falls, the acquisition unit 61 acquires the fall amount of the inflow air temperature Tair in a period during which the inflow air temperature Tair falls, as the temperature change amount $\Delta$Tair, and acquires the temporal length of the period, as the period length $\Delta$TM. Processes for acquiring the temperature change amount $\Delta$Tair and the period length $\Delta$TM will be described later.

The distortion amount derivation unit 62 derives a distortion amount S0 that is the degree of the distortion of the cooling device 14, based on the temperature change amount $\Delta$Tair acquired by the acquisition unit 61. That is, the distortion amount derivation unit 62 derives the distortion amount S0 that is the degree of the distortion of the cooling device 14 in the period during which the inflow air temperature Tair rises, based on the temperature change amount $\Delta$Tair in the period. Further, the distortion amount derivation unit 62 derives the distortion amount S0 that is the degree of the distortion of the cooling device 14 in the period during which the inflow air temperature Tair falls, based on the temperature change amount ΔTair in the period. A process for deriving the distortion amount S0 will be described later.

The damage value derivation unit 63 integrates a value depending on the distortion amount S0 derived by the distortion amount derivation unit 62, and thereby, derives an accumulated damage value DM that is the degree of the fatigue accumulated in the cooling device 14. A process for deriving the accumulated damage value DM will be described later.

The damage estimation device 60 further includes a notification processing unit 64. When the accumulated damage value DM is larger than a threshold value DMth, the notification processing unit 64 executes a notification process of giving notice. That is, in the notification process, the notification processing unit 64 gives notice that the replacement or maintenance of the cooling device 14 is necessary, to an occupant of the vehicle, through a notification device 70.

Process for Deriving Accumulated Damage Value DM

A processing routine that is executed by the control device 50 for deriving the accumulated damage value DM will be described with reference to FIG. 2 to FIG. 4. The processing routine shown in FIG. 2 is repeatedly executed when the operation of the internal combustion engine 10 is being performed.

Figure 2:
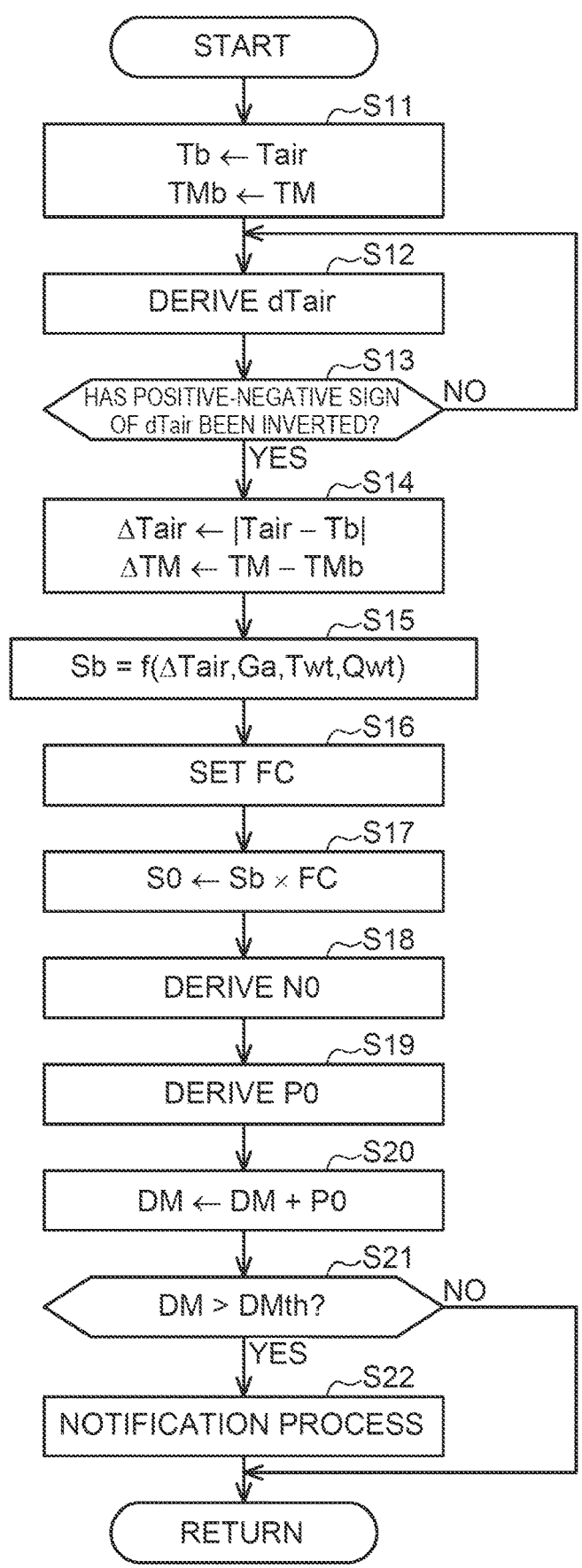
FIG. 2 is a flowchart for describing a processing routine that is executed by the control device in the first embodiment.

As shown in FIG. 2, in the processing routine, first, in step S11, the acquisition unit 61 of the control device 50 acquires the latest value of the inflow air temperature Tair, as a base air temperature Tb. Further, the acquisition unit 61 acquires a current time TM as a base time TMb. Subsequently, in step S12, the acquisition unit 61 derives a value resulting from differentiating the inflow air temperature Tair with respect to time, as an air temperature derivative value dTair. When the inflow air temperature Tair rises, a positive value is derived as the air temperature derivative value dTair. When the inflow air temperature Tair falls, a negative value is derived as the air temperature derivative value dTair.

Then, in step S13, the acquisition unit 61 determines whether the positive-negative sign of the air temperature derivative value dTair has been inverted. In the case of transition from the state where the inflow air temperature Tair rises to the state where the inflow air temperature Tair falls, the positive-negative sign of the air temperature derivative value dTair is inverted. Further, in the case of the transition from the state where the inflow air temperature Tair falls to the state where the inflow air temperature Tair rises, the positive-negative sign of the air temperature derivative value dTair is inverted. That is, in the case where the positive-negative sign of the last value of the air temperature derivative value dTair that is the air temperature derivative value dTair derived at the time of the last execution of the processing routine is different from the positive-negative sign of the currently derived air temperature derivative value dTair, it can be regarded that the positive-negative sign of the air temperature derivative value dTair has been inverted. On the other hand, in the case where the negative-positive sign of the last value of the air temperature derivative value dTair is the same as the positive-negative sign of the currently derived air temperature derivative dTair, it can be regarded that the positive-negative sign of the air temperature derivative value dTair has not been inverted.

In the case where it is not determined in step S13 that the positive-negative sign of the air temperature derivative value dTair has been inverted (NO), the acquisition unit 61 transfers the process to the above-described step S12. On the other hand, in the case where it is determined that the positive-negative sign of the air temperature derivative value dTair has been inverted (S13: YES), the acquisition unit 61 transfers the process to step S14. That is, when the period during which the inflow air temperature Tair rises ends, the process is transferred to step S14. Further, when the period during which the inflow air temperature Tair falls ends, the process is transferred to step S14.

In step S14, the acquisition unit 61 derives the difference between the latest value of the inflow air temperature Tair and the base air temperature Tb, as the temperature change amount ΔTair. Further, the acquisition unit 61 derives a value resulting from subtracting the base time TMb from the current time TM, as the period length ΔTM. That is, in the case where step S14 is executed because of the end of the period during which the inflow air temperature Tair rises, the rise amount of the inflow air temperature Tair in the period is derived as the temperature change amount ΔTair, and the temporal length of the period is derived as the period length ΔTM. On the other hand, in the case where step S14 is executed because of the end of the period during which the inflow air temperature Tair falls, the fall amount of the inflow air temperature Tair in the period is derived as the temperature change amount ΔTair, and the temporal length of the period is derived as the period length ΔTM. In the embodiment, step S14 corresponds to a "period information acquisition process".

Subsequently, in step S15, the distortion amount derivation unit 62 of the control device 50 derives a distortion amount base value Sb. The distortion amount derivation unit 62 derives the distortion amount base value Sb such that the value of the distortion amount base value Sb is larger as the temperature change amount ΔTair is larger.

The distortion amount derivation unit 62 may derive the distortion amount base value Sb based on the intake air amount Ga, in addition to the temperature change amount ΔTair. A state where the intake air amount Ga is large means that the amount of the air that flows in the cooling device 14 is large. As the amount of the air that flows in the cooling device 14 is larger, the temperature of the cooling device 14 changes more easily due to the inflow of the air into the cooling device 14. As the temperature change amount of the cooling device 14 due to the inflow of the air into the cooling device 14 is larger, the degree of the distortion that is generated in the cooling device 14 is likely to be larger. Therefore, the distortion amount derivation unit 62 may derive the distortion amount base value Sb such that the value of the distortion amount base value Sb is larger as the intake air amount Ga is larger.

Further, the distortion amount derivation unit 62 may derive the distortion amount base value Sb based on the coolant temperature Twt, in addition to the temperature change amount ΔTair. A state where the coolant temperature Twt is high means that the temperature of the cooling device 14 is likely to rise. As the rise amount of the temperature of the cooling device 14 is larger, the degree of the distortion that is generated in the cooling device 14 is likely to be larger. Therefore, the distortion amount derivation unit 62 may derive the distortion amount base value Sb such that the value of the distortion amount base value Sb is larger as the coolant temperature Twt is higher.

Further, the distortion amount derivation unit 62 may derive the distortion amount base value Sb based on the coolant amount Qwt, in addition to the temperature change amount ΔTair. A state where the coolant amount Qwt is small means that the temperature of the cooling device 14 is likely to rise. As the rise amount of the temperature of the cooling device 14 is larger, the degree of the distortion that is generated in the cooling device 14 is likely to be larger. Therefore, the distortion amount derivation unit 62 may derive the distortion amount base value Sb such that the value of the distortion amount base value Sb is larger as the coolant amount Qwt is smaller.

After the distortion amount derivation unit 62 derives the distortion amount base value Sb in step S15, the distortion amount derivation unit 62 transfers the process to step S16. In step S16, the distortion amount derivation unit 62 sets a value depending on the period length ΔTM, as a response coefficient FC. That is, when the period length ΔTM is shorter than a period length determination value ΔTMth, the distortion amount derivation unit 62 sets a larger value as the response coefficient FC than when the period length ΔTM is equal to or longer than the period length determination value ΔTMth. Further, when the period length ΔTM is shorter than the period length determination value ΔTMth, the distortion amount derivation unit 62 sets a larger value as the response coefficient FC, as the period length ΔTM is shorter. The period length determination value ΔTMth is set as a criterion for determining whether the speed of the rise or fall of the inflow air temperature Tair is slow.

Figure 3:
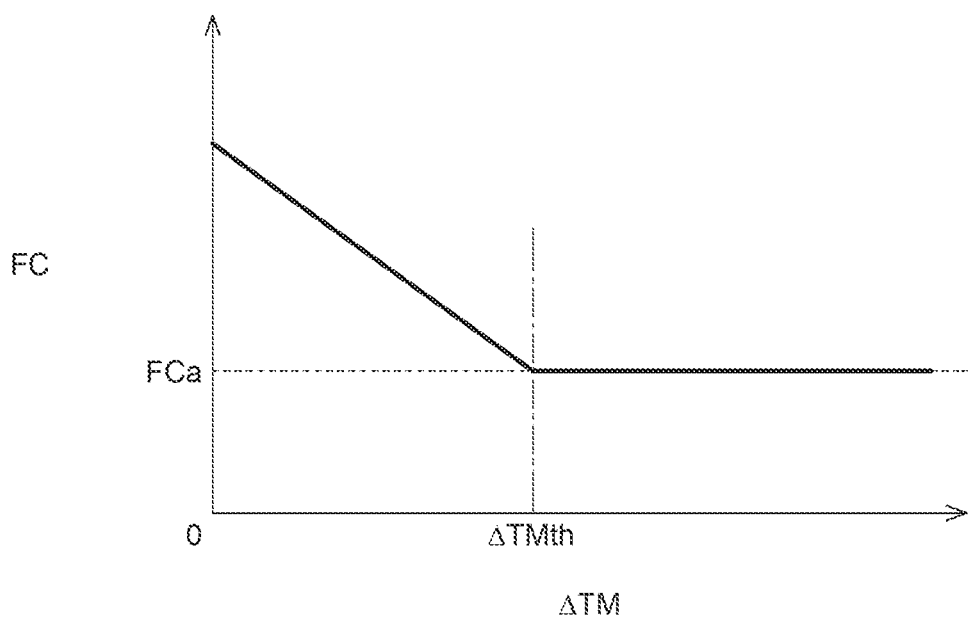
FIG. 3 is a map showing a relation between a period length and a response coefficient.

The distortion amount derivation unit 62 can set the response coefficient FC, using a map shown in FIG. 3, for example. FIG. 3 illustrates an exemplary map showing a relation between the period length ΔTM and the response coefficient FC. According to the map shown in FIG. 3, when the period length ΔTM is equal to or longer than the period length determination value ΔTMth, the response coefficient FC is set to a response coefficient lower limit FCa. For example, "1" is set as the response coefficient lower limit FCa. On the other hand, when the period length ΔTM is shorter than the period length determination value ΔTMth, the response coefficient FC is set to a value larger than the response coefficient lower limit FCa. Specifically, when the period length ΔTM is shorter than the period length determination value ΔTMth, the response coefficient FC is larger as the period length ΔTM is shorter.

Back to FIG. 2, after the distortion amount derivation unit 62 sets the response coefficient FC in step S16, the distortion amount derivation unit 62 transfers the process to step S17. In step S17, the distortion amount derivation unit 62 derives the product of the distortion amount base value Sb and the response coefficient FC, as the distortion amount S0. In the embodiment, when the period length ΔTM is shorter than the period length determination value ΔTMth, a larger value is set as the response coefficient FC than when the period length ΔTM is equal to or longer than the period length determination value ΔTMth. Therefore, when the period length ΔTM is shorter than the period length determination value ΔTMth, a larger value can be derived as the distortion amount S0 than when the period length ΔTM is equal to or longer than the period length determination value ΔTMth. Furthermore, in the embodiment, when the period length ΔTM is shorter than the period length determination value ΔTMth, a larger value is set as the response coefficient FC, as the period length ΔTM is shorter. Therefore, when the period length ΔTM is shorter than the period length determination value ΔTMth, a larger value can be derived as the distortion amount S0, as the period length ΔTM is shorter. In the embodiment, step S15, step S16 and step S17 correspond to a "distortion amount derivation process".

Subsequently, in step S18 the damage value derivation unit 63 of the control device 50 derives a fatigue limit number N0 based on the distortion amount S0. The number of inputs of the distortion amount S0 that is necessary for the cooling device 14 to reach the limit when the input of the distortion amount S0 to the cooling device 14 is repeated, or a value depending on the number of the inputs is set as the fatigue limit number N0. That is, the damage value derivation unit 63 derives a smaller value as the fatigue limit number N0, as the distortion amount S0 is larger. The "limit" herein means a state where the fatigue of the cooling device 14 has been accumulated to a level at which the replacement or maintenance of the cooling device 14 is necessary.

Figure 4:
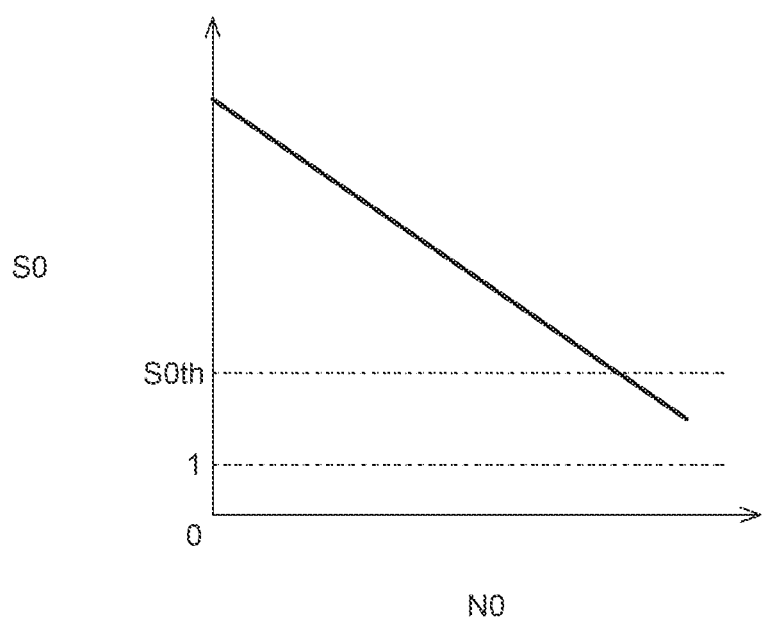
FIG. 4 is a map showing a relation between a distortion amount and a fatigue limit number.

The damage value derivation unit 63 can derive the fatigue limit number N0, using a map shown in FIG. 4, for example. FIG. 4 illustrates an exemplary map showing a relation between the distortion amount S0 and the fatigue limit number N0. According to the map shown in FIG. 4, the fatigue limit number N0 is smaller as the distortion amount S0 is larger.

Back to FIG. 2, after the damage value derivation unit 63 derives the fatigue limit number N0 in step S18, the damage value derivation unit 63 transfers the process to step S19. In step S19, the damage value derivation unit 63 derives a distortion damage value P0 based on the fatigue limit number N0 and the distortion amount S0. The distortion damage value P0 is a numerical value indicating the degree of the fatigue of the cooling device 14 due to the generation of the distortion. That is, in the embodiment, step S18 and step S19 correspond to a "conversion process" of converting the distortion amount S0 to the distortion damage value P0.

An example of the conversion process will be described. The damage value derivation unit 63 determines whether the distortion amount S0 is larger than a distortion amount determination value S0th. The distortion amount determination value S0th is set as a criterion for determining whether a distortion having such a magnitude that the fatigue is added in the cooling device 14 has been generated in the cooling device 14. When the distortion amount S0 is larger than the distortion amount determination value S0th, it can be regarded that the fatigue is added in the cooling device 14 by the generation of the distortion. On the other hand, when the distortion amount S0 is equal to or smaller than the distortion amount determination value S0th, it can be regarded that the fatigue is not added in the cooling device 14 even when the distortion is generated.

Therefore, when the distortion amount S0 is larger than the distortion amount determination value S0th, the damage value derivation unit 63 derives a larger value as the distortion damage value P0, as the fatigue limit number N0 is smaller. For example, when the distortion amount S0 is larger than the distortion amount determination value S0th, the damage value derivation unit 63 may derive a value resulting from dividing "1" by the fatigue limit number N0, as the distortion damage value P0. On the other hand, when the distortion amount S0 is equal to or smaller than the distortion amount determination value S0th, the damage value derivation unit 63 derives "0" as the distortion damage value P0.

After the damage value derivation unit 63 derives the distortion damage value P0 in step S19, the damage value derivation unit 63 transfers the process to step S20. In step S20, the damage value derivation unit 63 derives the sum of the last value of the accumulated damage value DM and the distortion damage value P0, as the latest value of the accumulated damage value DM. The last value of the accumulated damage value DM is the accumulated damage value DM derived at the time of the last execution of the processing routine shown in FIG. 2. That is, the integrated value of the distortion damage value P0 is derived as the accumulated damage value DM. The distortion damage value P0 is a value depending on the distortion amount S0. Therefore, it can be said that the accumulated damage value DM is a value that is derived by integrating the value depending on the distortion amount S0. In the embodiment, step S18, step S19 and step S20 correspond to a "damage value derivation process".

Subsequently, in step S21, the control device 50 determines whether the accumulated damage value DM is larger than the threshold value DMth. The threshold value DMth is set as a criterion for determining whether the fatigue of the cooling device 14 has been accumulated to a level at which the replacement or maintenance of the cooling device 14 is necessary. When the accumulated damage value DM is larger than the threshold value DMth, it can be regarded that the replacement or maintenance of the cooling device 14 is necessary. On the other hand, when the accumulated damage value DM is equal to or smaller than the threshold value DMth, it can be regarded that the replacement or maintenance of the cooling device 14 is still unnecessary. Therefore, when the accumulated damage value DM is equal to or smaller than the threshold value DMth (S21: NO), the control device 50 ends the processing routine once. On the other hand, when the accumulated damage value DM is larger than the threshold value DMth (S21: YES), the control device 50 transfers the process to step S22.

In step S22, the notification processing unit 64 of the control device 50 executes a notification process of giving notice that the replacement or maintenance of the cooling device 14 is necessary, to the occupant of the vehicle, through the notification device 70. Then, the control device 50 ends the processing routine once.

Action and Effect

Figure 5:
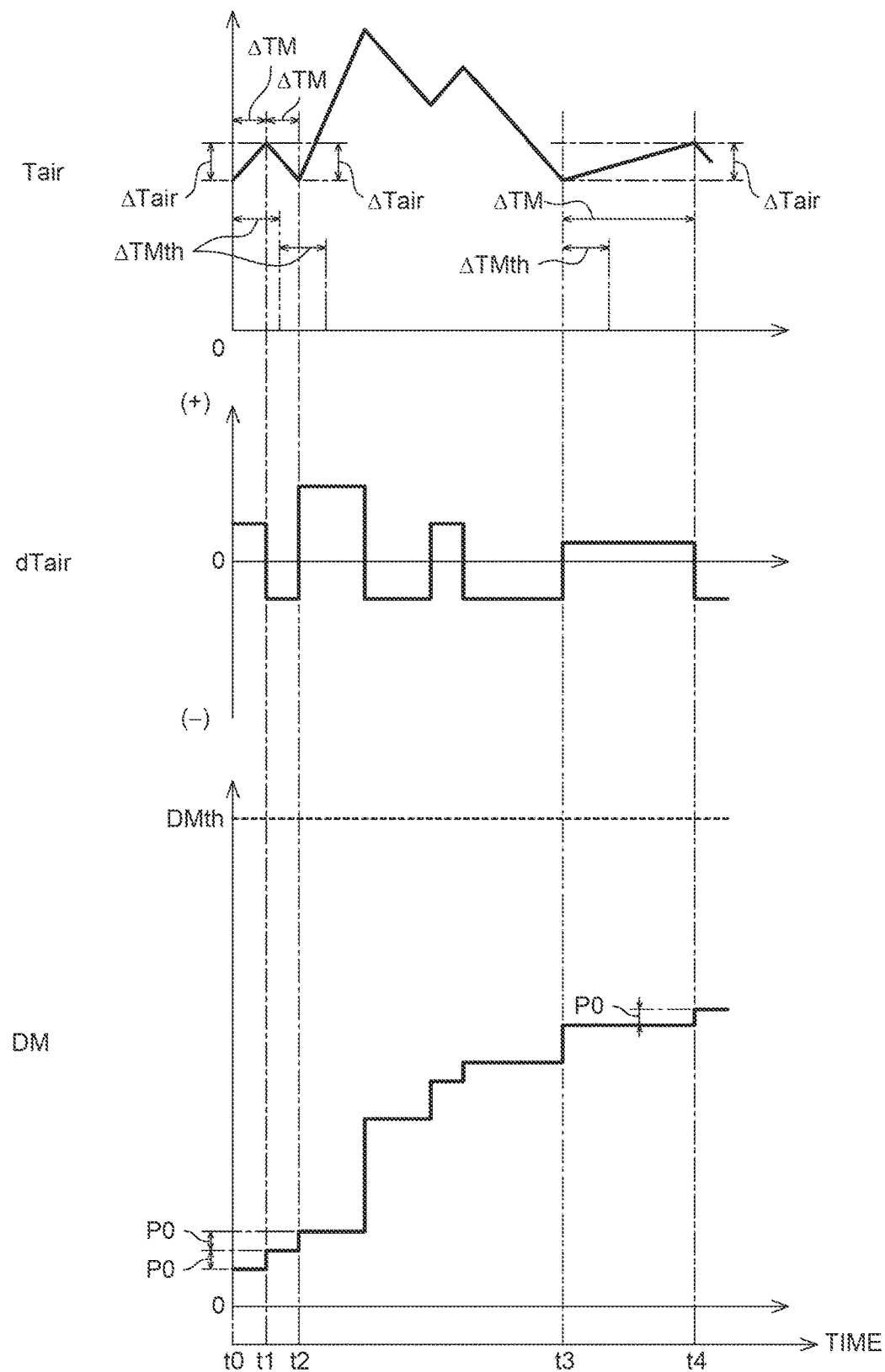
FIG. 5 is a timing chart when an accumulated damage value is derived.

Actions and effects of the embodiment will be described with reference to FIG. 5.

When the inflow air temperature Tair rises, the air temperature derivative value dTair is a positive value. For example, at timing t1, the change manner of the inflow air temperature Tair switches from rise to fall, and the rise amount of the inflow air temperature Tair in the period during which the inflow air temperature Tair rises is derived as the temperature change amount ΔTair. Further, the temporal length of the period during which the inflow air temperature Tair rise is derived as the period length ΔTM. Then, the distortion amount S0 is derived based on the temperature change amount ΔTair and the period length ΔTM. As the temperature change amount ΔTair is larger, a larger value is derived as the distortion amount S0. Further, when the period length ΔTM is shorter than the period length determination value ΔTMth, a larger value is derived as the distortion amount S0 than when the period length ΔTM is equal to or longer than the period length determination value ΔTMth. This is because the degree of the distortion of the cooling device 14 is larger as the rise speed of the inflow air temperature Tair is higher even when the temperature change amount ΔTair in the period during which the inflow air temperature Tair rises is the same.

A period from timing t0 to timing t1 is referred to as a first increase period, and a period from timing t3 to timing t4 is referred to as a second increase period. In each of the first increase period and the second increase period, the inflow air temperature Tair rises. Moreover, the temperature change amount ΔTair in the first increase period and the temperature change amount ΔTair in the second increase period are equal to each other. However, the period length ΔTM of the second increase period is longer than the period length ΔTM of the first increase period. In the example shown in FIG. 5, the period length ΔTM of the first increase period is shorter than the period length determination value ΔTMth, while the period length ΔTM of the second increase period is equal to or longer than the period length determination value ΔTMth. Therefore, the distortion amount S0 that is derived at timing t4 is smaller than the distortion amount S0 that is derived at timing t1.

On the other hand, when the inflow air temperature Tair falls, the air temperature derivative value dTair is a negative value. For example, at timing t2, the change manner of the inflow air temperature Tair switches from fall to rise, and the fall amount of the inflow air temperature Tair in the period during which the inflow air temperature Tair falls is derived as the temperature change amount ΔTair. Further, the temporal length of the period during which the inflow air temperature Tair falls is derived as the period length ΔTM. Then, the distortion amount S0 is derived based on the temperature change amount ΔTair and the period length ΔTM. As the temperature change amount ΔTair is larger, a larger value is derived as the distortion amount S0. Further, when the period length ΔTM is shorter than the period length determination value ΔTMth, a larger value is derived as the distortion amount S0 than when the period length ΔTM is equal to or longer than the period length determination value ΔTMth. This is because the degree of the distortion of the cooling device 14 is larger as the fall speed of the inflow air temperature Tair is higher even when the temperature change amount ΔTair in the period during which the inflow air temperature Tair falls is the same.

Then, the distortion damage value P0 is derived as the value depending on the distortion amount S0 derived as described above. The accumulated damage value DM is derived by integrating the distortion damage value P0. Thereby, it is possible to estimate the degree of the fatigue accumulated in the cooling device 14.

In the embodiment, when the accumulated damage value DM is larger than the threshold value DMth, it can be determined that the replacement or maintenance of the cooling device 14 is necessary. Therefore, in this case, the notification process is executed. Thereby, it is possible to notify the occupant and owner of the vehicle of the replacement or maintenance of the cooling device 14. In other words, before the notification process is executed, it is possible to use the vehicle without performing the replacement or maintenance of the cooling device 14.

In the embodiment, it is possible to further obtain the effects described below.

(1-1) When the period length ΔTM is shorter than the period length determination value ΔTMth, the degree of the distortion of the cooling device 14 is estimated to be large. Therefore, as the period length ΔTM is shorter, a larger value is derived as the distortion amount S0. On the other hand, when the period length ΔTM is equal to or longer than the period length determination value ΔTMth, there is little change in the degree of the distortion of the cooling device 14 due to the difference in the change speed of the inflow air temperature Tair. Consequently, when the period length ΔTM is equal to or longer than the period length determination value ΔTMth, a predetermined value is derived as the distortion amount S0. The predetermined value herein is the product of the distortion amount base value Sb and the response coefficient lower limit FCa. By deriving the accumulated damage value DM based on the distortion amount S0 derived in this way, it is possible to increase the estimation accuracy of the degree of the fatigue accumulated in the cooling device 14.

(1-2) When the distortion amount S0 is small, the accumulation of the fatigue of the cooling device 14 due to the generation of the distortion can be regarded as nearly "0". On the other hand, when the distortion amount S0 is large, the accumulation of the fatigue of the cooling device 14 due to the generation of the distortion can be estimated to be larger as the distortion amount S0 is larger. Hence, in the embodiment, when the distortion amount S0 is larger than the distortion amount determination value S0th, it can be determined that the distortion amount S0 is large. Therefore, as the distortion amount S0 is larger, a larger value is derived as the distortion damage value P0. On the other hand, when the distortion amount S0 is equal to or smaller than the distortion amount determination value S0th, it can be determined that the distortion amount S0 is small, and therefore, "0" is derived as the distortion damage value P0. Then, based on the distortion damage value P0, the accumulated damage value DM is derived. Thereby, it is possible to increase the estimation accuracy of the degree of the fatigue accumulated in the cooling device 14.

(1-3) In the embodiment, the distortion amount S0 is derived in consideration of the intake air amount Ga, the coolant temperature Twt and the coolant amount Qwt, in addition to the temperature change amount ΔTair. The degree of the distortion of the cooling device 14 varies depending on the intake air amount Ga, the coolant temperature Twt and the coolant amount Qwt. Therefore, it is possible to increase the derivation accuracy of the distortion amount S0 compared to the case where the distortion amount S0 is derived in consideration of only the temperature change amount ΔTair.

Second Embodiment

Next, a second embodiment of the damage estimation device and the damage estimation method will be described with reference to FIG. 6 to FIG. 8. In the following description, differences from the first embodiment will be mainly described. Member constituents identical or corresponding to those in the first embodiment are denoted by identical reference characters, and repetitive descriptions are omitted.

Figure 6:
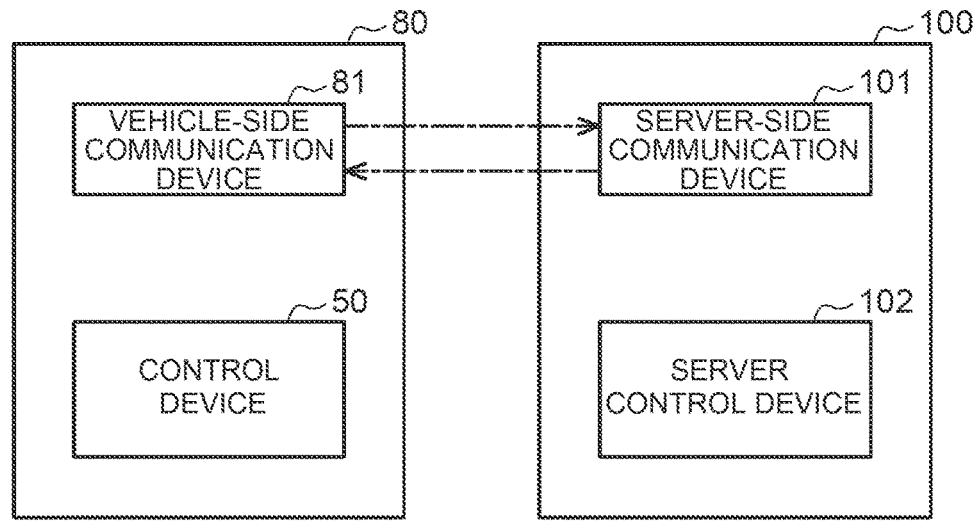
FIG. 6 is a block diagram showing a vehicle and a server in a second embodiment.
Figure 7:
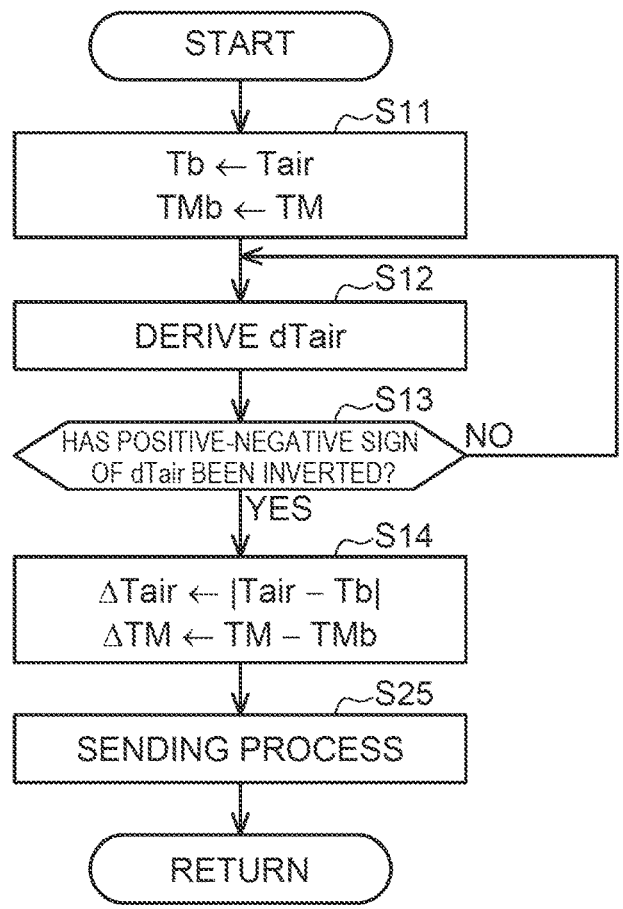
FIG. 7 is a flowchart for describing a processing routine that is executed by a control device of the vehicle in the second embodiment.

FIG. 6 illustrates a vehicle 80 and a server 100 that communicates with the vehicle 80.

The vehicle 80 includes a control device 50 and a vehicle-side communication device 81. The vehicle-side communication device 81 sends a variety of information derived by the control device 50, to the server 100. Further, the vehicle-side communication device 81 receives the information sent from the server 100.

The server 100 includes a server-side communication device 101 and a server control device 102. The server-side communication device 101 receives the information sent from the vehicle 80. Further, the server-side communication device 101 sends a variety of information derived by the server control device 102, to the vehicle 80.

In the damage estimation method in the embodiment, some processes of a plurality of processes constituting the method are executed by the control device 50, and the other processes are executed by the server control device 102. That is, the control device 50 and the server control device 102 correspond to an "execution device" that executes the plurality of processes constituting the damage estimation method. Further, the control device 50 executes a processing routine shown in FIG. 7, and the server control device 102 executes a processing routine shown in FIG. 8, so that the accumulated damage value DM is derived. In this regard, the control device 50 and the server control device 102 correspond to the "damage estimation device".

Flow of Process that is Executed in Vehicle 80

A processing routine that is executed by the control device 50 will be described with reference to FIG. 7. The processing routine is repeatedly executed.

In the processing routine, first, in step S11, the control device 50 acquires the base air temperature Tb and the base time TMb. Subsequently, in step S12, the control device 50 derives the air temperature derivative value dTair. Next, in step S13, the control device 50 determines whether the positive-negative sign of the air temperature derivative value dTair has been inverted. In the case where it is not determined that the positive-negative sign of the air temperature derivative value dTair has been inverted (S13; NO), the control device 50 transfers the process to the above-described step S12. On the other hand, in the case where it is determined that the positive-negative sign of the air temperature derivative value dTair has been inverted (S13: YES), the control device 50 transfers the process to step S14.

In step S14, the control device 50 derives the temperature change amount ΔTair and the period length ΔTM. That is, in the embodiment, step S14 corresponds to the "period information acquisition process".

Subsequently, in step S25, the control device 50 executes a sending process of sending information necessary to derive the accumulated damage value DM of the cooling device 14, to the server 100, through the vehicle-side communication device 81. That is, in the sending process, the control device 50 sends the temperature change amount ΔTair, the period length ΔTM, the intake air amount Ga, the coolant temperature Twt and the coolant amount Qwt, to the server 100. Then, the control device 50 ends the processing routine once.

Flow of Process that is Executed in Server 100

A processing routine that is executed by the server control device 102 will be described with reference to FIG. 8. The processing routine is executed when the server-side communication device 101 receives the information sent by the vehicle 80 in the sending process in the above step S25.

In the processing routine, first, in step S41, the server control device 102 derives the distortion amount base value Sb, similarly to the above step S15. Next, in step S42, the server control device 102 sets the response coefficient FC, similarly to the above step S16. Then, in step S43, the server control device 102 derives the distortion amount S0, similarly to the above step S17. That is, in the embodiment, step S41, step S42 and step S43 correspond to the "distortion amount derivation process".

Subsequently, in step S44, the server control device 102 derives the fatigue limit number N0 based on the distortion amount S0, similarly to the above step S18. Next, in step S45, the server control device 102 derives the distortion damage value P0, similarly to the above step S19. Then, in step S46, the server control device 102 derives the accumulated damage value DM, similarly to the above step S20. That is, in the embodiment, step S44, step S45 and step S46 correspond to the "damage value derivation process".

Next, in step S47, the server control device 102 determines whether the accumulated damage value DM is larger than the threshold value DMth, similarly to the above step S21. When the accumulated damage value DM is equal to or smaller than the threshold value DMth (S47: NO), the server control device 102 ends the processing routine. On the other hand, when the accumulated damage value DM is larger than the threshold value DMth (S47: YES), the server control device 102 transfers the process to step S48.

In step S48, the server control device 102 sends notice that the replacement or maintenance of the cooling device 14 is necessary, to the vehicle 80, through the server-side communication device 101. Then, the server control device 102 ends the processing routine once.

When the vehicle 80 receives the information sent from the server 100 in step S48, the control device 50 gives notice that the replacement or maintenance of the cooling device 14 is necessary, to the occupant of the vehicle 80, through the notification device 70. Accordingly, with the embodiment, it is possible to obtain the same effects as those in the first embodiment.

Modification

The above embodiments can be carried out by being modified as described below. The above embodiments and the following modifications can be carried out while being combined with each other, as long as there is no technical consistency.

- In the second embodiment, the period information acquisition process may also be executed by the server control device 102. In this case, the control device 50 of the vehicle 80 sends time-series data of the inflow air temperature Tair to the server 100, as information necessary to derive the temperature change amount ΔTair and the period length ΔTM.
- In the second embodiment, the distortion amount derivation process may be executed by the control device 50 of the vehicle 80. In this case, the control device 50 sends the distortion amount S0 derived in the distortion amount derivation process, to the server 100.
- In the first embodiment, it is not necessary to execute the notification process of giving notice that the replacement or maintenance of the cooling device 14 is necessary.
- In the case of deriving the distortion amount base value Sb in consideration of the temperature change amount ΔTair, it is not necessary to consider the intake air amount Ga in the derivation of the distortion amount base value Sb.
- In the case of deriving the distortion amount base value Sb in consideration of the temperature change amount ΔTair, it is not necessary to consider the coolant temperature Twt in the derivation of the distortion amount base value Sb.
- In the case of deriving the distortion amount base value Sb in consideration of the temperature change amount ΔTair, it is not necessary to consider the coolant amount Qwt in the derivation of the distortion amount base value Sb.
- In the above embodiments, when the distortion amount S0 is equal to or smaller than the distortion amount determination value S0th, "0" is derived as the distortion damage value P0, but the applicable embodiment is not limited to this. For example, when the distortion amount S0 is equal to or smaller than the distortion amount determination value S0th, a value slightly larger than "0" may be derived as the distortion damage value P0.
- Even when the distortion amount S0 is equal to or smaller than the distortion amount determination value S0th, the distortion damage value P0 may be varied depending on the distortion amount S0. For example, even when the distortion amount S0 is equal to or smaller than the distortion amount determination value S0th, the value resulting from dividing "1" by the fatigue limit number N0 may be derived as the distortion damage value P0.
- A value different from "1" may be set as the response coefficient lower limit FCa.
- In the above embodiments, when the period length ΔTM is equal to or longer than the period length determination value ΔTMth, the response coefficient lower limit FCa is set as the response coefficient FC, but the applicable embodiment is not limited to this. For example, even when the period length ΔTM is equal to or longer than the period length determination value ΔTMth, as the period length ΔTM is longer, a smaller value may be set as the response coefficient FC.
- When the period length ΔTM is shorter than the period length determination value ΔTMth, the response coefficient FC does not need to be varied depending on the period length ΔTM. For example, when the period length ΔTM is shorter than the period length determination value ΔTMth, a defined value larger than the response coefficient lower limit FCa may be set as the response coefficient FC.
- In the case of using the distortion damage value P0 derived based on the temperature change amount ΔTair in the period during which the inflow air temperature Tair rises and the period length ΔTM in the derivation of the accumulated damage value DM, it is not necessary to use the distortion damage value P0 derived based on the temperature change amount ΔTair in the period during which the inflow air temperature Tair falls and the period length ΔTM.
- The cooling device 14 may be an air-cooled-type intercooler.
- The internal combustion engine may have a configuration different from that of the above internal combustion engine 10, as long as the cooling device is provided on the intake passage. For example, the internal combustion engine may be an internal combustion engine that does not include the turbocharger 20.
- The cooling device for which the degree of the accumulated fatigue is estimated by the damage estimation device is not limited to the cooling device 14, and only needs to be a cooling device that cools the air that flows through the intake passage. For example, the cooling device may be a cooling device that is mounted on a fuel-cell vehicle.

What is claimed is:

1. A damage estimation system comprising:
a damage estimation device that is installed in a vehicle and configured to estimate degree of fatigue accumulated in a cooling device, the cooling device being configured to cool air that flows through an intake passage, the damage estimation device including
an acquisition unit configured to acquire a temperature change amount and a period length, the temperature change amount being a change amount of an inflow air temperature in a period during which the inflow air temperature rises, the inflow air temperature being a temperature of air that flows in the cooling device, the period length being a temporal length of the period,
a distortion amount derivation unit configured to derive a distortion amount such that a value of the distortion amount is larger as the temperature change amount is larger, the distortion amount being degree of distortion of the cooling device in the period, a damage value derivation unit configured to derive an accumulated damage value by integrating a value depending on the distortion amount, the accumulated damage value being the degree of the fatigue accumulated in the cooling device, and a notification processing unit configured to give notice that replacement or maintenance of the cooling device is necessary, to an occupant of the vehicle, through a notification device when the accumulated damage value is larger than a threshold value; and the notification device, wherein a value of the distortion amount derived by the distortion amount derivation unit when the period length is shorter than a period length determination value is larger than a value of the distortion amount derived when the period length is equal to or longer than the period length determination value.

2. The damage estimation system according to claim 1, wherein:

the acquisition unit is configured to acquire a temperature change amount and a period length, the temperature change amount being a change amount of the inflow air temperature in a period during which the inflow air temperature falls, the period length being a temporal length of the period; and the distortion amount derivation unit is configured to derive the distortion amount of the cooling device in the period during which the inflow air temperature falls, such that the value of the distortion amount is larger as the temperature change amount in the period is larger.

3. The damage estimation system according to claim 1, wherein:

when the period length is shorter than the period length determination value, the distortion amount derivation unit is configured to derive a larger value as the distortion amount, as the period length is shorter; and when the period length is equal to or longer than the period length determination value, the distortion amount derivation unit is configured to derive a predetermined value as the distortion amount.

4. The damage estimation system according to claim 1, wherein:

the damage value derivation unit is configured to derive the accumulated damage value, by executing a conversion process of converting the distortion amount into a distortion damage value and integrating the distortion damage value, the distortion damage value being degree of fatigue of the cooling device due to generation of distortion;

in the conversion process, when the distortion amount is larger than a distortion amount determination value, the damage value derivation unit is configured to derive a larger value as the distortion damage value, as the distortion amount is larger; and in the conversion process, when the distortion amount is equal to or smaller than the distortion amount determination value, the damage value derivation unit is configured to derive "0" as the distortion damage value.

5. The damage estimation system according to claim 1, wherein:

the cooling device is a water-cooled-type cooling device; and the distortion amount derivation unit is configured to derive the distortion amount based on an intake air amount, a temperature of coolant that is supplied to the cooling device, and a supply amount of the coolant to the cooling device, in addition to the temperature change amount.

6. A damage estimation method for estimating degree of fatigue accumulated in a cooling device that is installed in a vehicle and configured to cool air that flows through an intake passage of a drive source, the damage estimation method comprising:

acquiring a temperature change amount and a period length, the temperature change amount being a change amount of an inflow air temperature in a period during which the inflow air temperature rises, the inflow air temperature being a temperature of air that flows in the cooling device, the period length being a temporal length of the period;

deriving a distortion amount such that a value of the distortion amount is larger as the acquired temperature change amount is larger, the distortion amount being degree of distortion of the cooling device in the period; and deriving an accumulated damage value by integrating a value depending on the derived distortion amount, the accumulated damage value being the degree of the fatigue accumulated in the cooling device; and giving notice that replacement or maintenance of the cooling device is necessary, to an occupant of the vehicle, when the accumulated damage value is larger than a threshold value, wherein in deriving the distortion amount, a value of the distortion amount derived when the period length is shorter than a period length determination value is larger than a value of the distortion amount derived when the period length is equal to or longer than the period length determination value.

* * * * *